(12) United States Patent
Hirvonen et al.

(10) Patent No.: US 11,657,652 B2
(45) Date of Patent: *May 23, 2023

(54) SPOOF DETECTION BY CORRELATING IMAGES CAPTURED USING FRONT AND BACK CAMERAS OF A MOBILE DEVICE

(71) Applicant: Jumio Corporation, Palo Alto, CA (US)

(72) Inventors: David Hirvonen, Brooklyn, NY (US); Reza R. Derakhshani, Shawnee, KS (US)

(73) Assignee: Jumio Corporation, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/484,851

(22) Filed: Sep. 24, 2021

(65) Prior Publication Data

US 2023/0097348 A1 Mar. 30, 2023

(51) Int. Cl.
| | |
|---|---|
| *G06V 40/40* | (2022.01) |
| *G06T 5/00* | (2006.01) |
| *G06V 40/19* | (2022.01) |
| *G06V 40/18* | (2022.01) |
| *G06F 21/32* | (2013.01) |
| *H04N 5/247* | (2006.01) |
| *H04N 5/232* | (2006.01) |
| *G06V 10/70* | (2022.01) |

(52) U.S. Cl.
CPC ............. *G06V 40/45* (2022.01); *G06F 21/32* (2013.01); *G06T 5/006* (2013.01); *G06V 10/70* (2022.01); *G06V 40/19* (2022.01); *G06V 40/193* (2022.01); *G06V 40/197* (2022.01); *H04N 5/23229* (2013.01); *H04N 5/247* (2013.01)

(58) Field of Classification Search
None
See application file for complete search history.

(56) References Cited

U.S. PATENT DOCUMENTS

| | | | | |
|---|---|---|---|---|
| 2016/0026862 | A1* | 1/2016 | Anderson | G06V 40/19 382/117 |
| 2021/0303891 | A1* | 9/2021 | Wu | G06V 40/171 |

* cited by examiner

*Primary Examiner* — James M Anderson, II
(74) *Attorney, Agent, or Firm* — Patent Law Works LLP (57) ABSTRACT

Methods, systems, and computer-readable storage media for determining that a subject is a live person include obtaining a first image captured using a first camera disposed on a first side of a mobile device and obtaining a second image captured using a second camera disposed on a second side of the mobile device that is on the opposite side of the first side. The first image includes a representation of reflections visible on the corneas of a subject. The first image and the second image are pre-processing to generate a third image and a fourth image, respectively, where a first field of view represented in the third image at least partially overlaps with a second field of view of the fourth image. A determination is made, based on the third and fourth images, that a scene represented in the first field of view is substantially same as a scene represented in the second field of view. Responsive to determining that the scene represented in the first field of view is substantially same as the scene represented in the second field of view, identifying the subject as a live person.

20 Claims, 6 Drawing Sheets

SPOOF DETECTION BY CORRELATING IMAGES CAPTURED USING FRONT AND BACK CAMERAS OF A MOBILE DEVICE

TECHNICAL FIELD

This specification generally relates to security control using image capture devices.

BACKGROUND

Malicious actors have been known to attempt to breach the security of face recognition systems by using spoof or alternate representation of a face of an actual user. Examples of spoof or alternate representations can include, for example, an image of a person displayed on a high-resolution display device or printed as a photograph. Spoof/liveness detection systems attempt to identify whether subjects presented to image capture devices of such systems are real human users or spoof representations intended to breach the security of the systems.

SUMMARY

In one aspect, this document describes a method for controlling access to a secure system based on determining that a subject is a live person. The secure system is a system to which access is controlled, e.g. by using authentication and/or authorization of one or more users trying to access the system. The method includes obtaining a first image captured using a first camera disposed on a first side of a mobile device and obtaining a second image captured using a second camera disposed on a second side of the mobile device that is on the opposite side of the first side. The first image includes a representation of reflections visible on the corneas of a subject. The first image and the second image are pre-processing to generate a third image and a fourth image, respectively, where a first field of view represented in the third image at least partially overlaps with a second field of view of the fourth image. A determination is made, based on the third and fourth images, that a scene represented in the first field of view is substantially same as a scene represented in the second field of view. Responsive to determining that the scene represented in the first field of view is substantially same as the scene represented in the second field of view, it is identified that the subject is a live person.

In another aspect, this document describes a system for controlling access to a secure system based on determining that a subject is a live person. The system includes one or more computers; and one or more computer memory devices interoperably coupled with the one or more computers and having tangible, non-transitory, machine-readable media storing one or more instructions that, when executed by the one or more computers, perform various operations. The operations include obtaining a first image captured using a first camera disposed on a first side of a mobile device and obtaining a second image captured using a second camera disposed on a second side of the mobile device that is on the opposite side of the first side. The first image includes a representation of reflections visible on the corneas of a subject. The first image and the second image are pre-processing to generate a third image and a fourth image, respectively, where a first field of view represented in the third image at least partially overlaps with a second field of view of the fourth image. A determination is made, based on the third and fourth images, that a scene represented in the first field of view is substantially same as a scene represented in the second field of view. Responsive to determining that the scene represented in the first field of view is substantially same as the scene represented in the second field of view, it is identified that the subject is a live person.

In another aspect, this document describes one or more non-transitory computer-readable storage devices coupled to one or more processors and having instructions stored thereon which, when executed by the one or more processors, cause the one or more processors to perform various operations. The operations include obtaining a first image captured using a first camera disposed on a first side of a mobile device and obtaining a second image captured using a second camera disposed on a second side of the mobile device that is on the opposite side of the first side. The first image includes a representation of reflections visible on the corneas of a subject. The first image and the second image are pre-processing to generate a third image and a fourth image, respectively, where a first field of view represented in the third image at least partially overlaps with a second field of view of the fourth image. A determination is made, based on the third and fourth images, that a scene represented in the first field of view is substantially same as a scene represented in the second field of view. Responsive to determining that the scene represented in the first field of view is substantially same as the scene represented in the second field of view, it is identified that the subject is a live person.

Implementations of the above aspects can include one or more of the following features. Pre-processing the first image can include extracting a portion of the first image that includes the reflections visible on the corneas, and performing distortion corrections to compensate for the catadioptric reflection properties of the corneas. Pre-processing the first image and the second image can include scaling at least one of the first image or the second image. Pre-processing the first image can include removing the reflection of the mobile device from the representation of reflections visible on the corneas of a subject. Determining that the scene represented in the first field of view is substantially same as a scene represented in the second field of view can include: providing the third image and the fourth image as an input to a machine learning model trained using a corpus of image pairs where, one image in each pair is an image captured using a back camera of a mobile device, and another image in the same pair is an image captured using the front camera of the same mobile device of either the live person or a spoof representation of the live person, and determining, based on an output of the machine learning model in response to the input, that the scene represented in the first field of view is substantially same as a scene represented in the second field of view. The computer-implemented method can include initiating an authentication process for the subject in response to identifying the subject as the live person. A third field of view represented in the seventh image at least partially overlaps with a fourth field of view of the eighth image, determining, based on the fifth and sixth images, that a difference between a scene represented in the third field of view and a scene represented in the fourth field of view satisfies a threshold condition, and in response to determining that the difference between the scene represented in the third field of view and the scene represented in the fourth field of view satisfies the threshold condition, identifying the another subject as a spoof representation of the live person.

Particular implementations of the subject matter described in this disclosure can be implemented so as to realize one or more of the following advantages. The technology described herein can be used to reduce vulnerabilities of spoof detection systems that rely on eye-specific cues like corneal reflection of the environment to determine a liveness of a subject. For example, in order to make a spoof image appear like a properly captured selfie-image, the spoof image can be manipulated to include reflections of a mobile device visible on the corneas. The technology described herein addresses this vulnerability by extracting from a first image captured using a front-facing camera of a mobile device, a first scene reflected on the corneas of the subject, and correlating the first scene to a second scene depicted in a second image captured using the back-facing camera of the mobile device at substantially the same time. If the first scene is substantially same as the second scene, the environment reflected in the cornea of the user matches that of the environment of the mobile device, thereby indicating that the subject is likely a real human user. Conversely, if there are discrepancies between the first scene and the second scene, a determination may be made that the image of the subject is likely a spoof representation such as an image presented on a display device or printed on paper.

This spoof detection system can be implemented on resource-constrained environments such as mobile devices. By allowing a quick discrimination between captured images of a live person and captured images of a presentation attack instrument (e.g., a static or dynamic alternative representation of a subject), additional processing can be preemptively terminated, thereby creating an additional layer of security.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Like reference numbers and designations in the various drawings indicate like elements.

DETAILED DESCRIPTION

Biometric authentication systems can capture one or more images of a user, and can execute corresponding authentication processes on the captured image. Malicious attempts to breach the security of such a biometric authentication system can include presenting an alternative representation of a live person (also referred to as a spoof), including, for example, high resolution images displayed on a monitor or photographs printed on paper. In some cases, to misrepresent a spoof image as an authentic image, the images may be processed to include various realistic details. For example, to make a spoof image appear like an authentic selfie-mode image, the spoof image can be processed to include a reflection of one or more objects of an environment (e.g., a mobile device that is made to appear as the device that has captured the image). This can be done, for example, by including in the eye images pre-existing reflections, or pseudo-reflections. Images processed at such level of sophistication may be used for spoof attacks against systems that discriminate between spoof and real images simply by searching for details of reflections visible on the cornea.

The technology described herein improves robustness of spoof detection by detecting such sophisticated spoof attacks. Specifically, the technology extracts from a first image captured using a front-facing camera of a mobile device, details of a scene reflected on the corneas of the subject. Due to their shape and reflective properties, human corneas act as a catadioptric camera systems (e.g., spherical mirrors and lenses) with epipolar geometries (sectioned by parallels and meridians) that introduce particular types of distortions (which may be referred to as barrel distortions or simply catadioptric distortions) to the reflections visible on them. The portion of the first image that represents a cornea is extracted and preprocessed to generate the first scene. The preprocessing can include flattening the portion of the first image (for example, by compensating for catadioptric distortions) and scaling the flattened image to a size that would allow for a comparison with a second image captured using the back-facing camera of the mobile device. The second image is also preprocessed, for example, to ensure that the field of view of the flattened image is comparable to that of the second image. The scenes represented in the flattened image of the corneal reflection and the pre-processed second image captured by the back-facing camera are then compared to one another to determine whether they depict substantially the same scene. If the two scenes are substantially the same, it indicates that the environment reflected in the cornea of the user matches that of the mobile device, and as such, the subject is likely a real human user trying to get authenticated using the front-facing camera of the mobile device. Conversely, if there are discrepancies between the first scene and the second scene, a determination may be made that the image of the subject is likely a spoof representation, such as an image presented on a display device or printed on paper, and that a malicious access attempt is likely being made. Depending on determining that the subject is a real human being or a spoof, a subsequent process, such as an underlying authentication can be allowed to proceed or preemptively aborted, respectively.

Figure 1:
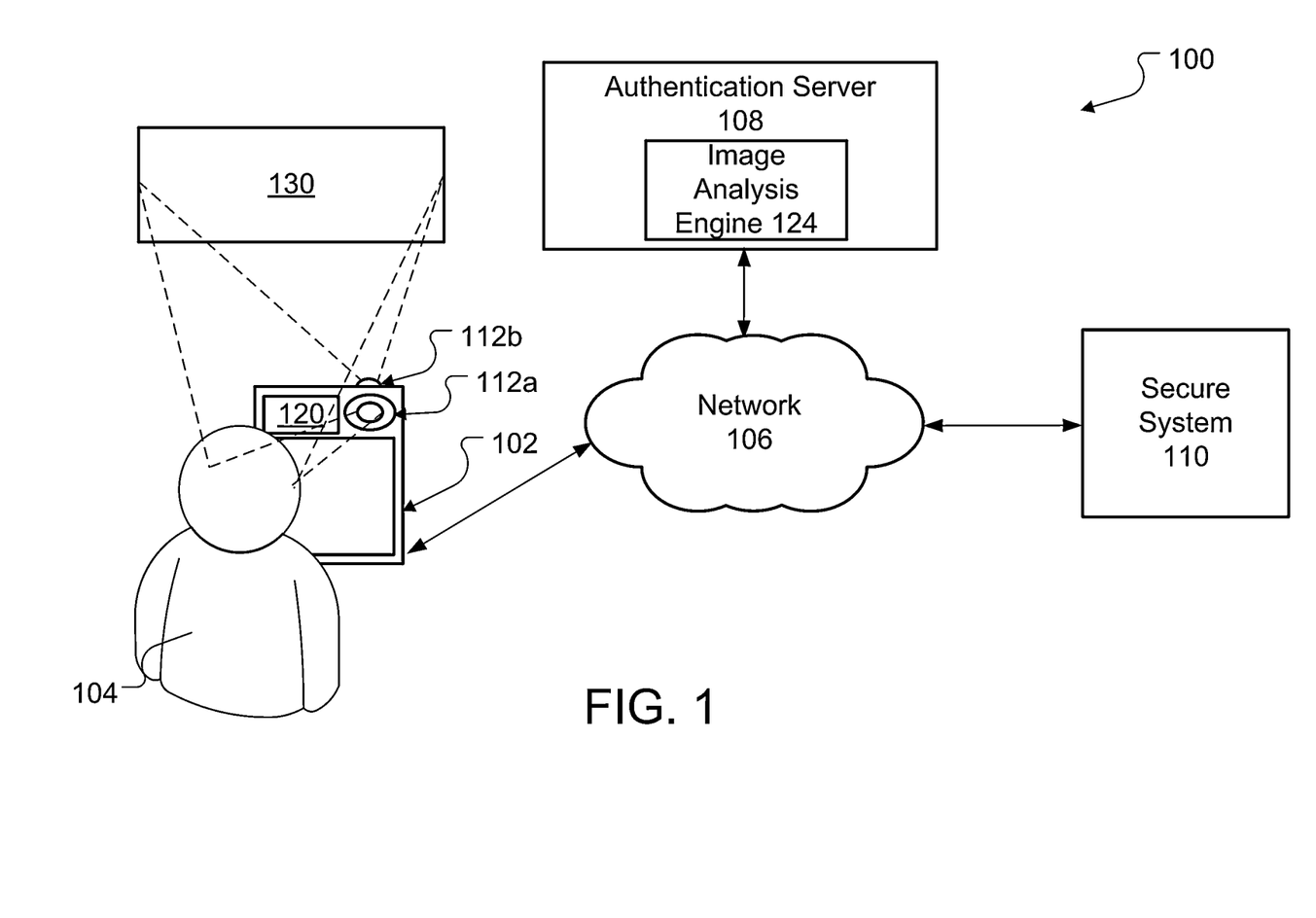
FIG. 1 depicts an example architecture in which the implementations of the present disclosure may be used.

FIG. 1 depicts an example architecture 100 in accordance with implementations of the present disclosure. In the depicted example, the example architecture 100 includes a user device 102, a network 106, an authentication server 108, and a secure system 110. In the depicted example, a user 104 interacts with the user device 102.

In some implementations, the user device 102 can communicate with the authentication server 108 and the secure system 110 over the network 106. The network 106 includes one or more of the following: a local area network (LAN), wide area network (WAN), the Internet, a virtual private network (VPN), etc., or a combination thereof. The network 106 connects user devices (e.g., the user device 102 to other user devices), the authentication server 108, and the secure system 110. In some implementations, the network 106 can be accessed over a wired and/or a wireless communications link.

In some implementations, the user device 102 include any appropriate type of computing devices configured to capture front and back images, such as a handheld computer, a tablet computer, a cellular telephone, a smart phone, or an appropriate combination of any two or more of these devices or other data processing devices.

In some implementations, the user device 102 can be a handheld mobile device. The user device 102 can be used for various purposes that require authenticating users 104 via one or more biometric authentication processes. For example, the user device 102 can be used to authenticate a user for one or more services (e.g., access of private data, a payment processing service, or secured communication) that are available to the user 104 via an application executing on the user device 102. The application executing on the user device 102 can require the user to be authenticated via a liveness detection process before allowing access to a secure system 110 associated with requested services The user device 102 (e.g., mobile device) can include a front camera 112a that can be configured to capture images of the user 104 interacting with the user device 102. The user device 102 (e.g., mobile device) can include a back camera 112b that can be configured to capture images of a scene behind the user device 102 including an object 130. The object 130 can be completely separated from the user device 102 or coupled with the user device 102. The object 130 can include one or more surrounding objects from near field or far field, such as a portion of a building, a portion of a nature view or other objects that can generate, reflect, or absorb light. The object 130 can be a static object, a dynamic object or a combination of static and dynamic objects. In some implementations, one or more properties of the object 130 can change during the liveness detection process. To minimize differences between the corneal reflections and the scene, the user device 102 can be configured to capture images using the front and back cameras 112a, 112b substantially simultaneously.

The user device 102 (e.g., mobile device) can include an image analysis engine 120 or the user device 102 can be communicably coupled to a remote an image analysis engine 124. The remote image analysis engine 124 can be located at a remote location with respect to the user device 102. For example, the image analysis engine 124 can be implemented on a server that is remotely located with respect to a user device 102, on which the sequence of images is captured. As shown in FIG. 1, for example, the image analysis engine 124 can be implemented on the authentication server 108. In such cases, the user device 102 can communicate with the image analysis engine 124 over one or more networks 106.

The image analysis engine 120, 124 can be configured to process the images captured by the front and back cameras 112a, 112b and perform the liveness detection process. The image analysis engine 120, 124 can determine whether the user 104 is an alternative representation of a live person using a trained machine-learning algorithm, as described with reference to FIG. 3. The image analysis engine 122, 124 can discriminate scene corneal reflections of the live people based on the previously trained machine-learning algorithm. A function of the user device 102 can be enabled of blocked in response to a liveness detection result generated by the image analysis engine 120, 124

In some implementations, the authentication server 108 includes at least one server and at least one data store. In the example of FIG. 1, the authentication server 108 is intended to represent various forms of servers including, but not limited to a web server, an application server, a proxy server, a network server, and/or a server pool. In general, server systems accept requests for application services and provide such services to any number of client devices (e.g., the user device 102 over the network 106).

In accordance with implementations of the present disclosure, and as noted above, the authentication server 108 controls whether user device 102 can have access to the secure system 110. For example, the image analysis engine 120, 122, 124 can determine that the captured images of the user 104 correspond to an alternative representation of a live person. Alternative representations of a live person can be an indicator of a malicious attempt of unauthorized access to the secure system 110, in which the perpetrator of the attempt points the user device 102, 104 towards a high quality photograph of an authorized user that is printed on paper, or a recorded video of the authorized user displayed on a high-resolution display panel. In response to determining that the user 104 is an alternative representation of a live person, the image analysis engine 120, 124 can preemptively prevent any of the images to be further processed by the authentication server 108, thereby controlling access to the secure system 110. If the image analysis engine 120, 124 determines that the images of the user 104 correspond to a live person, an authentication process based on one or more images of the user 104 can be initiated (e.g., at the authentication server 108) to determine if the live person is authorized to access the secure system. For example, after determining the liveness detection result, the user device 102 can send the liveness detection result to the authentication server 108 over a network 106. Based on the liveness detection result, the authentication server 108 can allow or prevent access to the secure system 110.

Figure 2A:
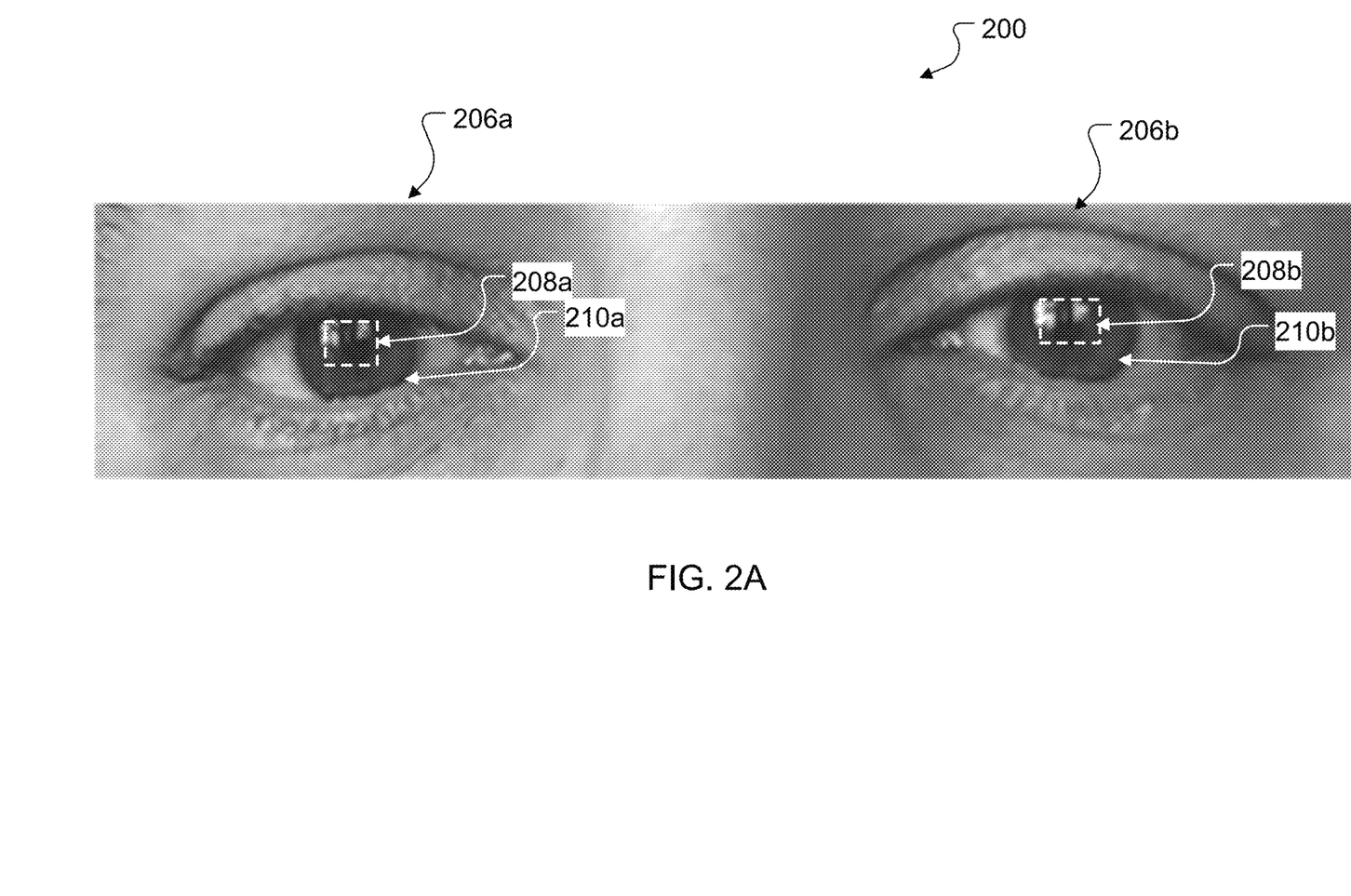
FIGS. 2A-2C depict examples of images in accordance with implementations of the present disclosure.
Figure 2B:
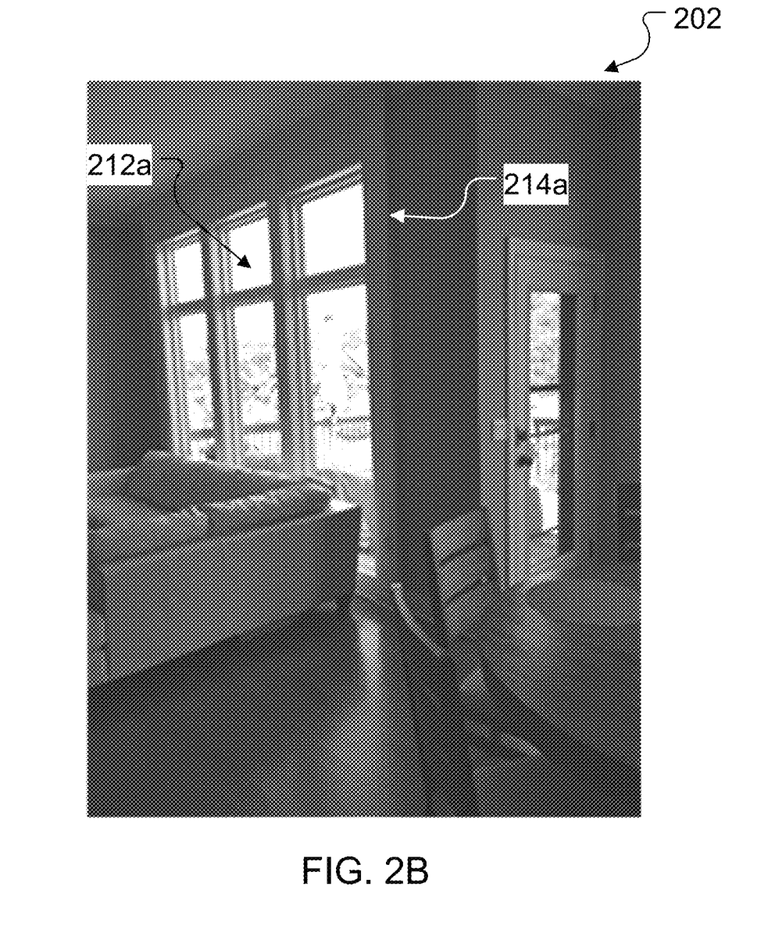
Figure 2C:
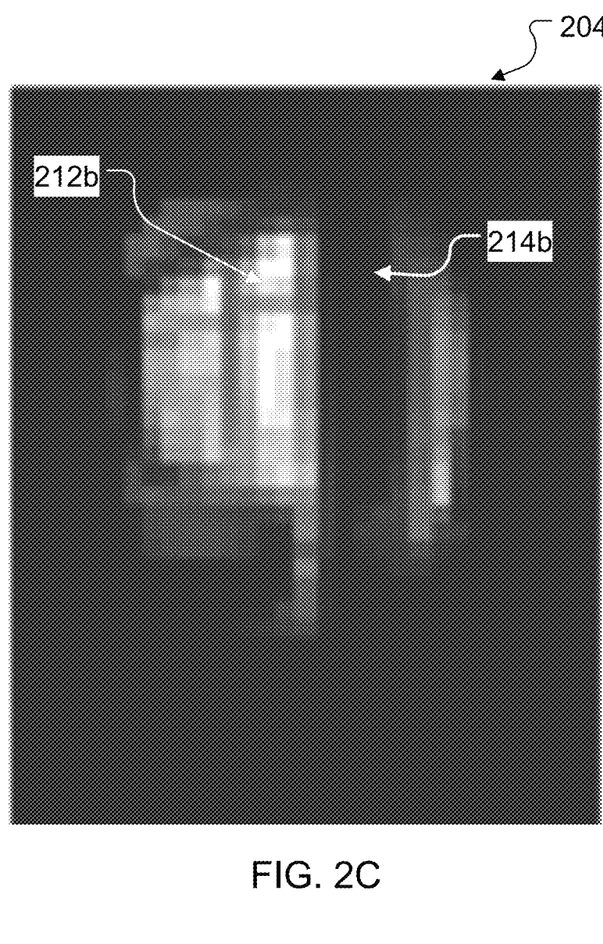

FIGS. 2A-2C show examples of images 200, 202, 204 generated during a liveness detection process for alternative representations of a live person. FIG. 2A includes an example of an eye image 200 that can be captured by a front camera of a mobile device (e.g., a phone or a tablet) facing towards the eyes 206a, 206b of the subject. In some implementations, the example of the eye image 200 can be captured to include both eyes 206a, 206b of the subject without additional surrounding facial features or it can be processed to crop out facial features surrounding the region of interest that includes the iris 210a, 210b of the eyes 206a, 206b of the subject.

The example of the eye image 200 includes one or more features of the eyes 206a, 206b and reflections 208a, 208b of a portion of a scene that is in front of the subject. The eye image 200 can be processed to determine one or more reflection parameters of each reflection 208a, 208b. The reflection parameters can include one or more geometrical characteristics of the reflection. In some implementations, the reflections 208a, 208b can be processed to perform distortion corrections to compensate for the catadioptric reflection properties of the corneas. In some implementations, the reflections 208a, 208b can be processed to remove the reflection of the mobile device from the representation of reflections 208a, 208b.

FIG. 2B includes an example of a scene image 202 that can be captured by a back camera of the mobile device (e.g., a phone or a tablet) facing away from the subject substantially simultaneous with the capture of the eye image 200. The scene image 202 includes a bright portion 212a and a dark contrasting portion 214a with distinctive geometric shapes (e.g. bright outdoors or well-lit window panes that contrast dark window frames and interior colors). In some cases, the presence of a bright feature together with contrasting dark features in the scene can cause the mobile device to reduce the sensitivity of the front-facing camera (e.g., by lowering the exposure value). However, this may cause the corresponding reflections on the cornea to be dimmed—which may not be beneficial for the technology described herein. As such, in some implementations, a prep-processing step for capturing the images can include increasing the sensitivity of the front camera, even in the presence of a bright feature in the scene, prior to capturing the images. In some implementations, the nature of the bright feature by itself can provide insights into whether or not a potential presentation attack is taking place. For example, if the presentation attack instrument is a spoof image of a subject presented on a high-resolution display device, the brightness of the display device itself can raise the overall brightness of a captured image above a threshold. In some implementations, if the overall brightness level of the image exceeds a threshold condition (e.g., such as that may be expected for an image displayed on a screen), a confidence level associated with a determination that the subject is a live human being can be reduced.

FIG. 2C includes an example of a scene image 204 that was reconstructed based on the eye reflections 208a, 208b that were extracted from the example of the eye image 200. The scene image 204 can include reflections that are corrected/compensated to account for catadioptric distortions introduced by the cornea. For example, the scene image 204 from the cornea can include a spherically and radiometrically corrected corneal reflection of the scene. The scene image 204 can be subjected to one or more additional pre-processing steps to generate another image that can be meaningfully compared with the scene 202. For example, as described in further detail with reference to FIG. 3, preprocessing the scene image 202 and/or the scene image 204 can include steps that ultimately generate two images that are compared in shape, size, resolution, and/or field of view such that the two images can be compared to determine whether or not the two images represent substantially the same scene. If the two images indeed represent substantially the same scene, a determination may be made that the subject of the front camera is a live human being. On the other hand, if the discrepancies between the two images exceed a threshold, a determination can be made that a presentation attack is likely being attempted with a spoof representation of the subject. For example, if the scene image 202 captured by the back camera of the mobile device matches the scene image 204 reconstructed based on the corneal reflections captured by the front camera, the subject can be determined as likely being a live human being. Scene matching in terms of presence of one or more dominant scene features having distinctive geometric shapes can be used to determine that the subject is a live person.

Figure 3:
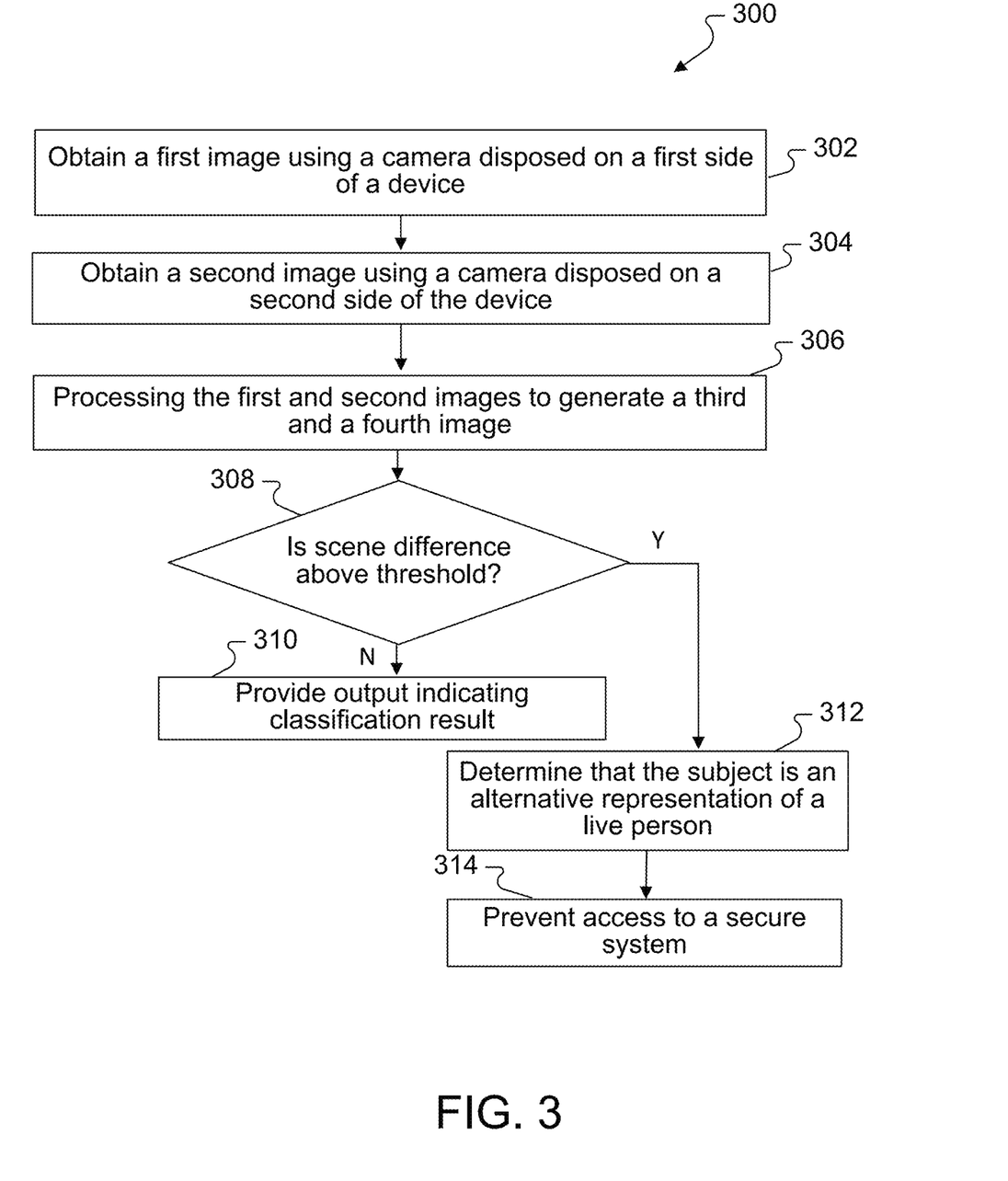
FIG. 3 is a flowchart of an example process that can be executed in accordance with implementations of the present disclosure.

FIG. 3 depicts an example process 300 for liveness detection. In some implementations, at least a portion of the process 300 can be executed by one of more components of the example architecture 100 described with reference to FIG. 1. In some implementations, at least a portion of the process 300 may be executed by the image analysis engine (e.g., 120 or 122 or 124) depicted in FIG. 1. In some implementations, at least a portion of the process 300 may be executed by one or more servers (e.g., authentication server 108 or computing devices in a distributed computing system) in communication with remote components such as one or more processing devices disposed within a user device (e.g., the user device 102).

A first image captured using a first camera disposed on a first (e.g., front) side of a mobile device is obtained (302). The first image can include an eye image of a subject. In some implementations, the eye image of the subject is preprocessed to determine existence of corneal reflections. If corneal reflections are not visible, the first camera can modify one or more settings (e.g., increase exposure) to mitigate the chances of the corneal reflections being too dim.

A second image captured using a second (e.g., back) camera disposed on a second side of the user device is obtained to capture images of a scene including an object of interest (304). In some implementations, the first and second images are captured substantially simultaneously to minimize changes that might be generated by dynamic objects included in the scene. Capturing the scene images can include processing the captured scene images to determine a quality metric based on existence and features of one or more sources of light or contrast. In some implementations, if the quality factor is below a preset quality threshold, one or more settings of the back camera are adjusted to recapture of the scene images with increased contrast. In some implementations, one or more settings of a display panel of the user device are also updated to increase a predicted contrast of corneal scene reflections. For example, a luminosity of the display panel can be decreased to increase contrast of the scene reflections. In some implementations, the scene images are repeatedly recaptured after one or more first and second camera adjustments and display panel adjustments, until the quality metric exceeds the quality threshold.

The first image and the second image are processed to generate a third image and a fourth image (306). This can include, for example, scaling at least one of the first image or the second image. In some implementations, the pre-processing of the first image can include extracting a portion of the first image that includes the reflections visible on the corneas, and performing distortion corrections to compensate for the catadioptric reflection properties of the corneas (e.g., to correct for the corneal curvature represented in the reflection). In some implementations, the image processing techniques can include removing, from the representation of reflections visible on the corneas of a subject, representations of one or more objects that are unrelated to the scene, such as reflections of one or both of a user's extended arm and the mobile device held by the user. This can be done, for example, using an in-painting or retouching process in which the pixels corresponding to the user's arm and the mobile device are replaced by extrapolated pixel values from the rest of the image. In some implementations, the image processing techniques can include application of a filter to remove noise from the captured images, to spatially align the captured images, and to extract the regions of interest (e.g., eye regions)

In view of the differences between the optical features of the cameras of the user device and the optical features of the catadioptric corneas, the pre-processing can include adjusting the fields of vision of one or both images such that a field of view represented in the third image can at least partially overlap with a field of view of the fourth image. The scene characteristics can be extracted from the fields of view of the third image and the fourth image. The field of view rectification process can enable an extraction of the scene characteristics (e.g., distance from object of interest to corneas) defining a part of the corneal reflected image within a region of interest to eliminate sections that are not visible to the back camera. The field of view rectification process can convert the image of the scene within the region of interest extracted from corneas to a size equal to the image of the object of interest extracted from the scene images captured by the back camera of the user device. In some implementations, the rectification process includes cropping the scene reflections, such that the field of view of the human eye (e.g., corresponding to 120°) matches the field of view of the back camera, which depends on the set optical features of the camera lens. In some implementations, the rectification process includes rotating the images to match an orientation angle of the user device, as determined by an internal sensor of the user device. In some implementations, the rectification process includes detection of user's extending arm and phone in the corneal reflections and updating the scene images (to include these features) or cropping the images of the corneal reflections to exclude reflection sources that are outside of the field of view of the back camera. The rectified scene images can be further processed to extract the scene characteristics including an object of interest or one or more scene features.

It is determined whether scene differences between the third and fourth images are greater than a threshold (308). The comparison of the scene differences can include matching of scene characteristics. Matching of scene characteristics can include image-matching methods. Image matching methods can be performed using Siamese deep neural networks that can be trained end to end to detect matching scene images (indicative of live, genuine corneal reflections of scenes) versus non-matching scene images (indicative of spoof, malicious). In some implementations, the threshold defines an acceptable variation range between the third and fourth images that indicates live, genuine corneal reflections of scenes. If the differences are smaller than the threshold, an output is provided indicating the classification result (e.g., the corneal reflections correspond to a live person) (310). The output can trigger initiation of an authentication process for the subject in response to identifying the subject as a live person. If the differences between the third and fourth images are greater than the threshold, it is determined that one or more scene characteristics (e.g., a contrasting feature or an object visible in the scene image captured by the back camera is missing from the processed corneal reflections) do not match a corresponding scene characteristics. The difference exceeding the acceptable threshold indicates that the subject can be an alternative representation of a live person (312).

If it is determined that the subject is an alternative representation of a live person, access to a secure system is prevented (314). In some implementations, controlling access to the secure system can include preemptively preventing any of the images to be further processed by the authentication server 108, thereby controlling access to the secure system. In some implementations, controlling access to the secure system can terminate an application of the user device and/or disabling a functionality of the user device for interrupting a network communication with a secure system for a predetermined duration. Controlling access to the secure system can improve performance of an underlying biometric authentication system by filtering out spoof attacks at a front end, and thereby reducing waste of computational resources.

Figure 4:
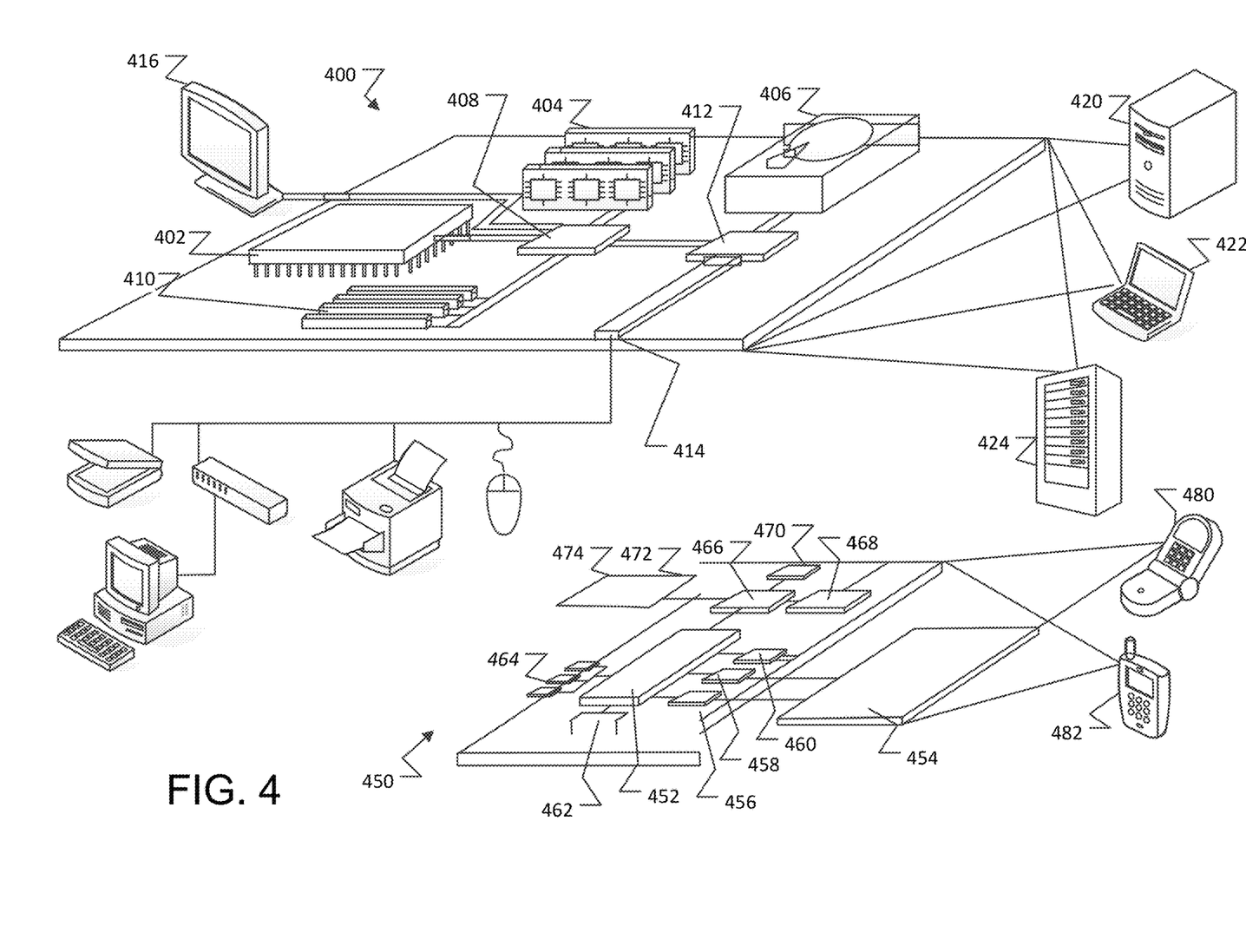
FIG. 4 is a schematic illustration of example computer systems that can be used to execute implementations of the present disclosure.

FIG. 4 shows an example of a computing device 400 and a mobile device 450, which may be used with the techniques described here. For example, referring to FIG. 1, the user device 102 can include one or more of the computing device 400, either in part or in its entirety. The user device 102 can include one or more of the mobile device 450, either in part or in its entirety. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high-speed controller 408 manages bandwidth-intensive operations for the computing device 400, while the low speed controller 412 manages lower bandwidth-intensive operations. Such allocation of functions is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. For example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, Wi-Fi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. The sound may include sound from voice telephone calls, may include recorded sound (e.g., voice messages, music files, and so forth) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, tablet computer, or other similar mobile device.

The computing device 450 is configured to perform operations comprising obtaining a first image captured using a first camera disposed on a first side of a mobile device, the first image including representation of reflections visible on the corneas of a subject; obtaining a second image captured using a second camera disposed on a second side of the mobile device, the second side being on the opposite side of the first side; pre-processing the first image and the second image to generate a third image and a fourth image, respectively, wherein a first field of view represented in the third image at least partially overlaps with a second field of view of the fourth image; determining, based on the third and fourth images, that a scene represented in the first field of view is substantially same as a scene represented in the second field of view; and in response to determining that the scene represented in the first field of view is substantially same as the scene represented in the second field of view, identifying the subject as a live person. In some implementations, pre-processing the first image comprises: extracting a portion of the first image that includes the reflections visible on the corneas; and performing distortion corrections to compensate for the catadioptric reflection properties of the corneas. Pre-processing the first image and the second image comprises scaling at least one of the first image or the second image. Pre-processing the first image comprises removing the reflection of the mobile device from the representation of reflections visible on the corneas of a subject. Determining that the scene represented in the first field of view is substantially same as a scene represented in the second field of view comprises: providing the third image and the fourth image as an input to a machine learning model trained using a corpus of image pairs wherein, one image in each pair is an image captured using a back camera of a mobile device, and another image in the same pair is an image captured using the front camera of the same mobile device of either the live person or a spoof representation of the live person; and determining, based on an output of the machine learning model in response to the input, that the scene represented in the first field of view is substantially same as a scene represented in the second field of view. The operations further comprise initiating an authentication process for the subject in response to identifying the subject as the live person. The operations further comprise obtaining a fifth image captured using the first camera, the fifth image including representation of reflections visible on the corneas of another subject; obtaining a sixth image captured using the second camera; pre-processing the fifth image and the sixth image to generate a seventh image and an eighth image, respectively, wherein a third field of view represented in the seventh image at least partially overlaps with a fourth field of view of the eighth image; determining, based on the fifth and sixth images, that a difference between a scene represented in the third field of view and a scene represented in the fourth field of view satisfies a threshold condition; and in response to determining that the difference between the scene represented in the third field of view and the scene represented in the fourth field of view satisfies the threshold condition, identifying the another subject as a spoof representation of the live person.

Figure 5:
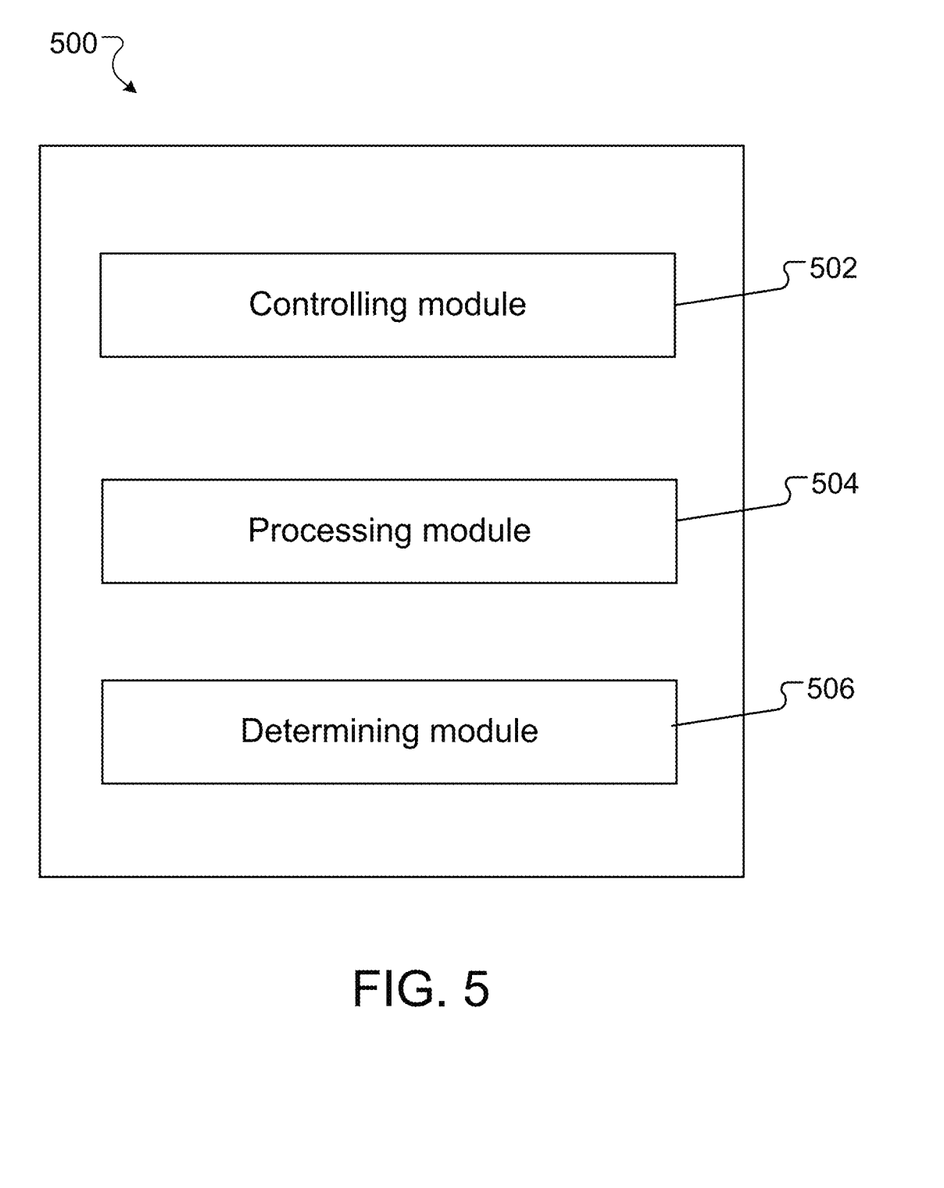
FIG. 5 depicts examples of modules of an apparatus in accordance with implementations of the present disclosure.

FIG. 5 depicts examples of modules of an apparatus 500 in accordance with one or more embodiments of the present disclosure. The apparatus can be an example of an embodiment of a system configured to perform subject liveness detection based on corneal scene reflections. The apparatus 500 can correspond to the embodiments described above, and the apparatus 500 includes the following: a controlling module 502 that controls an image acquisition device to capture images using a front camera and a back camera of a scene; a processing module 504 that processes the images by a matched filtering process using the process described with reference to FIG. 3; and a determining module 506 that determines that the subject is an alternative representation of a live person based on the difference between the scene images. In response to determining that the subject is an alternative representation of a live person, the determining module 506 prevents access to a secure system, such as system 110 described with reference to FIG. 1.

In some embodiments, the alternative representation of the live person includes a photograph of the live person printed on paper, or presented on a display panel. In some embodiments, the alternative representation of the live person includes video replay of the live person on a display panel. In some embodiments, the determining module 506 determines that the subject is an alternative representation of a live person based on the filtered response image by: processing the filtered response image using a machine learning process trained to discriminate between filtered response images of live persons and filtered response images of alternative representations of the live persons.

In some embodiments, the apparatus 500 includes an initiating module that initiates an authentication process for determining if the live person is authorized to access the secure system in response to determining that the second subject is a live person.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be for a special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural, object-oriented, assembly, and/or machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display panel (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a GUI or a web browser through which a user can interact with an implementation of the systems and techniques described here), or any combination of such back end, middleware, or front end components. The components of the system can be interconnected by any form or medium of digital data communication, such as network 106 of FIG. 1. Examples of communication networks include a LAN, a WAN, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications may be made without departing from the scope of the inventive concepts described herein, and, accordingly, other implementations are within the scope of the following claims.

What is claimed is:

1. A computer-implemented method comprising:
obtaining a first image captured using a first camera disposed on a first side of a mobile device, the first image including representation of reflections visible on corneas of a subject;
obtaining a second image captured using a second camera disposed on a second side of the mobile device, the second side being on the opposite side of the first side;
pre-processing the first image and the second image to generate a third image and a fourth image, respectively, wherein a first field of view represented in the third image at least partially overlaps with a second field of view of the fourth image;
determining, based on the third and fourth images, that a scene represented in the first field of view is substantially same as a scene represented in the second field of view; and
in response to determining that the scene represented in the first field of view is substantially same as the scene represented in the second field of view, identifying the subject as a live person.

2. The computer-implemented method of claim 1, wherein pre-processing the first image comprises:
extracting a portion of the first image that includes the reflections visible on the corneas; and
performing distortion corrections to compensate for catadioptric reflection properties of the corneas.

3. The computer-implemented method of claim 1, wherein pre-processing the first image and the second image comprises scaling at least one of the first image or the second image.

4. The computer-implemented method of claim 1, wherein pre-processing the first image comprises removing the reflection of the mobile device from the representation of reflections visible on the corneas of a subject.

5. The computer-implemented method of claim 1, wherein determining that the scene represented in the first field of view is substantially same as a scene represented in the second field of view comprises:
providing the third image and the fourth image as an input to a machine learning model trained using a corpus of image pairs wherein,
one image in each pair is an image captured using a back camera of a mobile device, and
another image in the same pair is an image captured using the front camera of the same mobile device of either the live person or a spoof representation of the live person; and
determining, based on an output of the machine learning model in response to the input, that the scene represented in the first field of view is substantially same as a scene represented in the second field of view.

6. The computer-implemented method of claim 1, further comprising initiating an authentication process for the subject in response to identifying the subject as the live person.

7. The computer-implemented method of claim 1, further comprising:
obtaining a fifth image captured using the first camera, the fifth image including representation of reflections visible on the corneas of another subject;
obtaining a sixth image captured using the second camera;
pre-processing the fifth image and the sixth image to generate a seventh image and an eighth image, respectively, wherein a third field of view represented in the seventh image at least partially overlaps with a fourth field of view of the eighth image;
determining, based on the fifth and sixth images, that a difference between a scene represented in the third field of view and a scene represented in the fourth field of view satisfies a threshold condition; and
in response to determining that the difference between the scene represented in the third field of view and the scene represented in the fourth field of view satisfies the threshold condition, identifying the another subject as a spoof representation of the live person.

8. A non-transitory, computer-readable medium storing one or more instructions executable by a computer system to perform operations comprising:
obtaining a first image captured using a first camera disposed on a first side of a mobile device, the first image including representation of reflections visible on corneas of a subject;
obtaining a second image captured using a second camera disposed on a second side of the mobile device, the second side being on the opposite side of the first side;
pre-processing the first image and the second image to generate a third image and a fourth image, respectively, wherein a first field of view represented in the third image at least partially overlaps with a second field of view of the fourth image;
determining, based on the third and fourth images, that a scene represented in the first field of view is substantially same as a scene represented in the second field of view; and
in response to determining that the scene represented in the first field of view is substantially same as the scene represented in the second field of view, identifying the subject as a live person.

9. The non-transitory, computer-readable medium of claim 8, wherein pre-processing the first image comprises:
extracting a portion of the first image that includes the reflections visible on the corneas; and
performing distortion corrections to compensate for catadioptric reflection properties of the corneas.

10. The non-transitory, computer-readable medium of claim 8, wherein pre-processing the first image and the second image comprises scaling at least one of the first image or the second image.

11. The non-transitory, computer-readable medium of claim 8, wherein pre-processing the first image comprises removing the reflection of the mobile device from the representation of reflections visible on the corneas of a subject.

12. The non-transitory, computer-readable medium of claim 8, wherein determining that the scene represented in the first field of view is substantially same as a scene represented in the second field of view comprises:
providing the third image and the fourth image as an input to a machine learning model trained using a corpus of image pairs wherein,
one image in each pair is an image captured using a back camera of a mobile device, and
another image in the same pair is an image captured using the front camera of the same mobile device of either the live person or a spoof representation of the live person; and
determining, based on an output of the machine learning model in response to the input, that the scene represented in the first field of view is substantially same as a scene represented in the second field of view.

13. The non-transitory, computer-readable medium of claim 8, further comprising initiating an authentication process for the subject in response to identifying the subject as the live person.

14. The non-transitory, computer-readable medium of claim 8, further comprising:
obtaining a fifth image captured using the first camera, the fifth image including representation of reflections visible on the corneas of another subject;
obtaining a sixth image captured using the second camera;
pre-processing the fifth image and the sixth image to generate a seventh image and an eighth image, respectively, wherein a third field of view represented in the seventh image at least partially overlaps with a fourth field of view of the eighth image;
determining, based on the fifth and sixth images, that a difference between a scene represented in the third field of view and a scene represented in the fourth field of view satisfies a threshold condition; and
in response to determining that the difference between the scene represented in the third field of view and the scene represented in the fourth field of view satisfies the threshold condition, identifying the another subject as a spoof representation of the live person.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
obtaining a first image captured using a first camera disposed on a first side of a mobile device, the first image including representation of reflections visible on corneas of a subject,
obtaining a second image captured using a second camera disposed on a second side of the mobile device, the second side being on the opposite side of the first side,
pre-processing the first image and the second image to generate a third image and a fourth image, respectively, wherein a first field of view represented in the third image at least partially overlaps with a second field of view of the fourth image,
determining, based on the third and fourth images, that a scene represented in the first field of view is substantially same as a scene represented in the second field of view, and
in response to determining that the scene represented in the first field of view is substantially same as the scene represented in the second field of view, identifying the subject as a live person.

16. The computer-implemented system of claim 15, wherein pre-processing the first image comprises:
extracting a portion of the first image that includes the reflections visible on the corneas; and
performing distortion corrections to compensate for catadioptric reflection properties of the corneas.

17. The computer-implemented system of claim 15, wherein pre-processing the first image and the second image comprises scaling at least one of the first image or the second image.

18. The computer-implemented system of claim 15, wherein pre-processing the first image comprises removing the reflection of the mobile device from the representation of reflections visible on the corneas of a subject.

19. The computer-implemented system of claim 15, wherein determining that the scene represented in the first field of view is substantially same as a scene represented in the second field of view comprises:
providing the third image and the fourth image as an input to a machine learning model trained using a corpus of image pairs wherein,
one image in each pair is an image captured using a back camera of a mobile device, and
another image in the same pair is an image captured using the front camera of the same mobile device of either the live person or a spoof representation of the live person; and
determining, based on an output of the machine learning model in response to the input, that the scene represented in the first field of view is substantially same as a scene represented in the second field of view.

20. The computer-implemented system of claim 15, further comprising:
obtaining a fifth image captured using the first camera, the fifth image including representation of reflections visible on the corneas of another subject;
obtaining a sixth image captured using the second camera;
pre-processing the fifth image and the sixth image to generate a seventh image and an eighth image, respectively, wherein a third field of view represented in the seventh image at least partially overlaps with a fourth field of view of the eighth image;
determining, based on the fifth and sixth images, that a difference between a scene represented in the third field of view and a scene represented in the fourth field of view satisfies a threshold condition;
in response to determining that the difference between the scene represented in the third field of view and the scene represented in the fourth field of view satisfies the threshold condition, identifying the another subject as a spoof representation of the live person; and initiating an authentication process for the subject in response to identifying the subject as the live person.

* * * * *